United States Patent [19]

Combier

[11] Patent Number: 4,549,048
[45] Date of Patent: Oct. 22, 1985

[54] DIGITAL ECHO CANCELLER

[75] Inventor: Michel Combier, Choisy le Roi, France

[73] Assignee: Telecommunications Radioelectriques, Paris, France

[21] Appl. No.: 581,220

[22] Filed: Feb. 22, 1984

Related U.S. Application Data

[63] Continuation of Ser. No. 302,281, Sep. 15, 1981, abandoned.

[30] Foreign Application Priority Data

Sep. 19, 1980 [FR] France ................................ 80 20251

[51] Int. Cl.[4] ............................................. H04B 3/20
[52] U.S. Cl. ................................ 179/170.2; 179/170.8
[58] Field of Search ............... 179/170.2, 170.6, 170.8; 307/358; 382/53

[56] References Cited

U.S. PATENT DOCUMENTS

| | | | |
|---|---|---|---|
| 3,836,734 | 9/1974 | Campanella et al. | 179/170.2 |
| 4,064,484 | 12/1977 | Mese et al. | 382/53 |
| 4,113,997 | 9/1978 | Horna | 179/170.2 |
| 4,268,727 | 5/1981 | Agrawal et al. | 179/170.2 |
| 4,334,128 | 6/1982 | Snijders | 179/170.2 |
| 4,362,909 | 12/1982 | Snijders et al. | 179/170.2 |

Primary Examiner—Gene Z. Rubinson
Assistant Examiner—Randall P. Myers
Attorney, Agent, or Firm—Thomas A. Briody; William J. Streeter

[57] ABSTRACT

An echo canceller is used to cancel an echo signal occurring in the receive path of a data transmission modem in response to the signal appearing in the transmit path. This echo canceller comprises a controllable digital filter connected to the transmit path and adjusted by means of a control circuit, a difference circuit producing a residual signal resulting from the difference between the signal in the receive path and the synthetic echo signal supplied by the filter and an analog-to-digital converter which converts the residual signal into a digital control signal for the control circuit. In order to have the echo canceller function in a homochronous transmission system with an analog-to-digital converter having a reduced number of bits, the converter is controllable and is adjusted by the output signal of an attenuation circuit connected to the output of a circuit which detects the peak value of the residual signal.

4 Claims, 4 Drawing Figures

DIGITAL ECHO CANCELLER

This is a continuation of application Ser. No. 302,281, filed Sept. 15, 1981, abandoned.

BACKGROUND OF THE INVENTION

The invention relates to an echo canceller for connection between a first and a second one-way transmission path having opposite signal directions and being connected to the four-wire side of a four-wire-to-two-wire coupling circuit, having for its purpose to cancel an echo signal occurring in the second path in response to the signal in the first path, the echo canceller including:

a controllable digital signal processing arrangement, connected to the first path and having an input for receiving a control signal, for providing a synthetic echo signal in response to the signal in the first path and the digital control signal, a difference circuit for producing a residual signal resulting from the difference between the signal in the second path and the synthetic echo signal produced by the controllable signal processing arrangement, and an analog-to-digital converter for converting the residual signal into the digital control signal for application thereof to the controllable digital signal processing arrangement.

An echo canceller is used in, for example, a data transmission modem whose transmitter and receiver are interconnected by means of the coupling circuit, usually referred to as a hybrid junction, in a manner such that the mode has a two-wire access to the exterior. It is known that when a connection is provided between the two-wire access of two modems, an echo signal may be produced in the receive path of a modem, which echo signal is formed by a portion of the signal from the transmit path of the same modem and is due to imperfections of the hybrid junction thereof and/or reflections of the transmit signal in the connection. An echo canceller is used to automatically canel this echo signal appearing in the receive path. The advantage of this echo cancellation is that it enables a simultaneous transmission between two modems which are interconnected by way of their two-wire access.

The structure of the above-described echocanceller is well-known and disclosed in, for example, Applicants' French published Patent Applications Nos. 2,358,790 and 2,377,734, which relate to baseband and voice-band data transmission, respectively. The controllable digital signal processing arrangement is generally an adaptive digital filter or an assembly of digital filters coupled to the transmit path of the modem and comprising a control circuit for the coefficients of this filter or of this filter assembly. In order to simplify the terminology, the controllable digital signal processing arrangement will be simply denoted digital filter hereinafter. This filter supplies a digital signal which is designated the synthetic echo signal and is converted into the analog form before being applied to an input of the difference circuit, the other input of which receives the signal which appears in the receive path of the modem and which includes the echo signal to be cancelled. The signal produced by the difference circuit is denoted the residual signal hereinafter. Samples of this residual signal are applied to an analog-to-digital converter which produces the digital version of the residual signal used as a control signal for the control circuit for the filter coefficients. The circuitry described in, for example, the above-mentioned Patent Applications are used in this control circuit and makes it possible to adjust the coefficients iteratively so that these coefficients converge to values which minimize the mean square error of the remaining echo signal present in the residual signal and resulting from the difference between the real echo signal and the synthetic echo signal supplied by the filter. This convergence, resulting in, the cancellation of or substantial decrease of the echo signal, must be realized in the presence of the received useful data signal originating from the remote modem. This useful data signal is superposed on the echo signal remaining in the residual signal and its level with respect to the level of the remaining echo signal becomes increasingly large during the convergence. In certain cases, this may cause a problem which results from the analog-to-digital conversion of the residual signal, and which may result in stopping of convergence at a comparatively high level of the remaining echo signal.

This problem is encountered, in particular, in the case of homochronous data transmission if one wants to employ a less accurate analog-to-digital converter in order to reduce cost. It is known that in a homochronous data transmission system, the data are transmitted in synchronism with a local clock synchronized to the received data. In the echo canceller, this local clock is also used to time the sampling pulses for the residual signal. From this it follows that the sampling instants of the residual signal have a fixed position in time with respect to the received data signal. If, for example, one wants to use a very simple analog-to-digital converter producing a digital signal having one bit indicating only the polarity of the residual signal, the value of this digital signal is only of significance for the polarity of the remaining echo signal if, at the sampling instants, the amplitude of this remaining echo signal is greater than the amplitude of the received data signal. In a homochronous transmission system, the opposite situation may permanently prevail in which no change of the filter coefficients, tending to a reduction of the remaining echo signal, will occur, this remaining echo signal staying at a high value in the order of magnitude of the received data signal. The same problem is encountered, although to a lesser extent, if a somewhat more accurate 2- or 3-bit converter is used, for the remaining echo stays at a value of the order of magnitude of the smallest quantization step. A solution which allows use of a converter producing a digital one-bit signal and which yet allows convergence of the coefficients to a very low value of the remaining echo signal is disclosed in U.S. patent application Ser. No. 128,418, filed on Mar. 10, 1980, now U.S. Pat. No. 4,334,128. This solution consists of combining the residual signal with an auxiliary signal having no correlation with this residual signal and employing this combined signal, after conversion into a digital one-bit signal, for the control of the coefficients.

SUMMARY OF THE INVENTION

The present invention has for its object to provide another solution which avoids the use of this auxiliary signal and which makes it possible, in a homochronous transmission system, to obtain the convergence of the echo canceller to a very low value of the remaining echo signal, using an analog-to-digital converter having a reduced number of bits, even as low as 2 bits.

According to the invention, in a digital echo canceller employing an analog-to-digital converter for converting the residual signal produced by the difference circuit of the echo canceller the analog-to-digital converter has controllable dynamics, which is adjusted by a dynamics control signal derived from a circuit for the detection of the level of the residual signal.

With this echo canceller, the dynamics of the analog-to-digital converter decreases accordingly as the amplitude of the remaining echo signal decreases during the convergence, it then being possible to employ a converter producing a digital signal having a small number of bits, whose value remains characteristic of the residual echo signal until a very low value of its level.

Preferably, the dynamics control signal is derived by means of an attenuation circuit coupled to the output of a detector circuit for detecting the peak value of the residual signal.

Preferably, the output signal of the attenuation circuit forms a reference signal which is employed in the converter for forming threshold signals with which the residual signal to be converted is compared, the two threshold signals with the greatest amplitude and opposite signs having an amplitude equal to the amplitude of the output signal of the attenuation circuit.

It is possible to employ a converter which produces a two-bit digital signal by comparing the residual signal with these two threshold signals of opposite signs.

As the remaining echo signal is proportional to $v_p(1-\uparrow)$, where $v_p$ is the detected peak-value of the residual signal and $\beta$ the attenuation coefficient of the attenuation circuit, it is advantageous to choose $\beta$ rather close to 1 (for example $\beta=0.9$) to reduce the ultimately remaining echo.

DESCRIPTION OF THE DRAWINGS

The invention will now be further described, by way of non-limitative example, with reference to the accompanying drawings, in which.

DESCRIPTION OF THE PREFERRED EMBODIMENT

Figure 1:
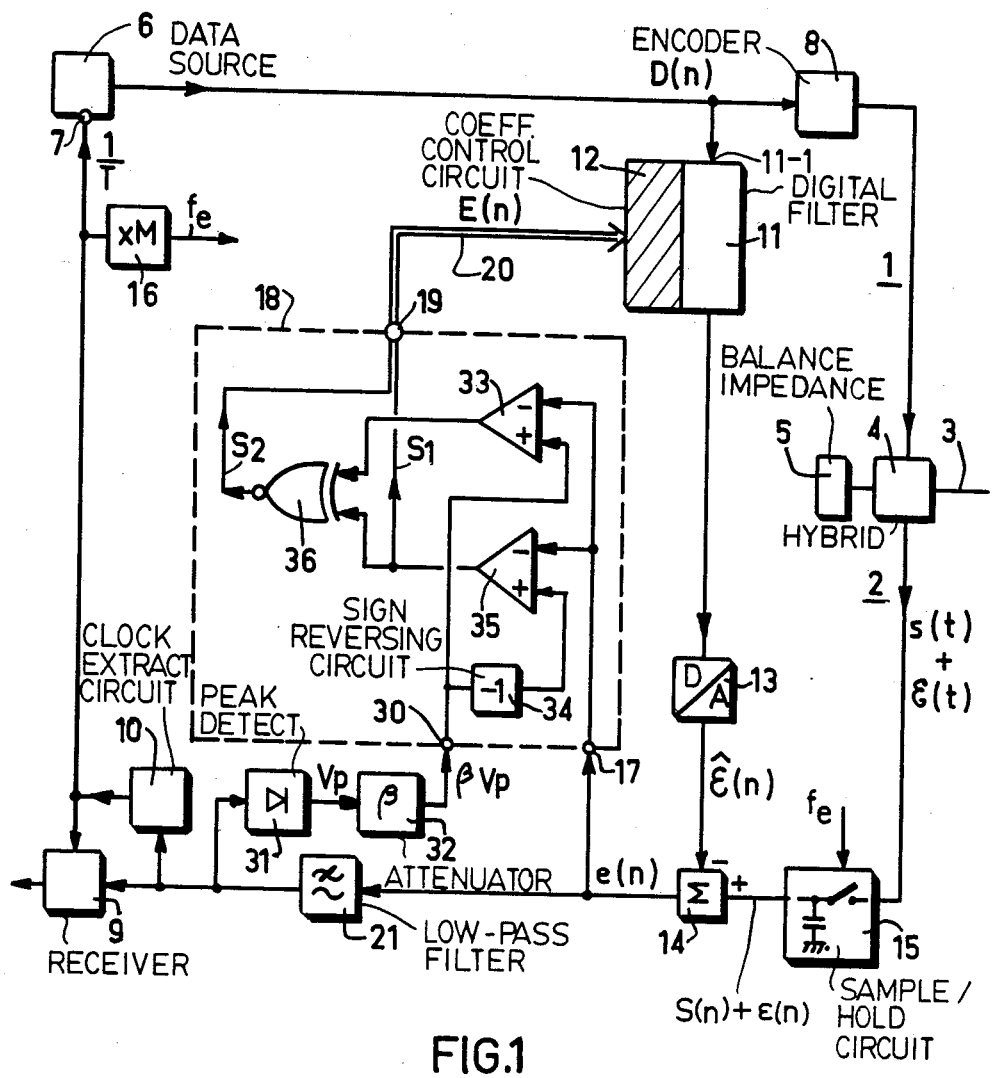
FIG. 1 shows a block diagram of an echo canceller in accordance with the invention.

FIG. 1 shows the block diagram of the echo canceller of the invention which is connected in a modem. This modem comprises a one-way transmit path 1 and a one-way receive path 2 which are coupled to a two-way transmission line 3 by means of a hybrid junction 4 comprising a balance impedance 5.

A data source 6, producing data at the rate $1/\tau$ of a clock signal applied to its clock terminal 7, is connected to the transmit path 1. It is assumed that this data is transmitted in baseband and applied to an encoder 8 in which, for example, a biphase coding and a low-pass filtering action are performed. The data signal encoded thus is applied to the input of the four-wire side of the hybrid junction 4 and transmitted to the remote modem, not shown, by way of the transmission line 3.

The data signal transmitted, in a similar manner, by the remote modem is received in the local modem and directed by the hybrid junction 4 to the receive path 2 of the modem. This received signal, which has the same character as the signal applied to the input of the four-wire side of the hybrid junction 4, is applied to a receiver 9, which has for its task to restitute the data transmitted by the remote modem, and to a clock extraction circuit 10, which has for its task to apply to the receiver 9 a clock signal having the frequency $1/\tau$ synchronous to the clock signal of frequency $1/\tau$ used in the remote modem for transmitting the data.

In that portion of the homochronous transmission system which is shown in FIG. 1, the clock signal produced by the circuit 10 is also applied to the clock terminal 7 of the data source 6, so that the local modem and the remote modem transmit data synchronously. It should here be noted that in a what is commonly referred to as a plesiochronous transmission system, in which the data is not transmitted in synchronism with the received data, the clock signal applied to the data source 6 would be obtained from a clock generator which is independent of the extraction circuit 10.

If a data signal originating from the transmit path 1 of the local modem is applied to the input of the four-wire side of the hybrid junction 4, there appears in the receive path 2 of this modem an echo signal $\epsilon(t)$, which is due to unavoidable imperfections in the balance of the hybrid junction 4 and/or impedance discontinuities in the transmission line 3 which produce signal reflections. In the receive path 2, this echo signal $\epsilon(t)$ is superposed on the useful data signal s(t) received from the remote modem and may prevent the correct restitution of the data by the receiver 9.

An echo canceller is used to cancel this echo signal and comprises a controllable digital signal processing arrangement 11, which receives the binary data signal produced by data source 6, and also comprises a control circuit 12 for having the output signal of the signal processing arrangement 11 vary.

It is assumed hereinafter that this arrangement 11 is a digital filter which performs linear operations cancel a linear echo signal. Then the control circuit 12 is a circuit which adjusts the coefficients of the digital filter 11. The digital output signal of the filter 11 is converted into an analog signal by means of a digital-to-analog converter 13. This signal, designated the synthetic echo signal, is applied to the (−) input of a difference circuit 14. The (+) input of this difference circuit 14 is connected to the output of a sample-and-hold circuit 15, in which the signal s(t)+$\epsilon$(t), on the receive path 2 appearing at the output of the four-wire side of the hybrid junction 4, is sampled. The sampling frequency $f_e$ is a multiple of the data rate $1/\tau$ and its value $M/\tau$ is chosen such that the Shannon theorem is satisfied with regard to the signal s(t). A signal at the sampling frequency $f_e=M/\tau$ is formed by a frequency-multiplying circuit 16 connected to the output of the clock extraction circuit 10.

A residual signal e(n) resulting from the sum of the received useful data signal s(t) and the difference signal between the real echo signal $\epsilon$(t) and the synthetic echo signal $\hat{\epsilon}$(t) at the sampling instants t=nT is obtained at the output of the difference circuit 14. This difference signal is denoted the residual signal hereinafter. The residual signal produced by the difference circuit 14 is applied to an input 17 of an analog-to-digital converter, 18. At an output 19 of this converter there appears the digital residual signal E(n), which is applied by means of a bus 20 to the control circuit 12 for the adjustment of the values of the coefficients of the digital filter 11. These coefficients must be adjusted in such a manner that the remaining echo signal is substantially cancelled at the sampling instants nT, so that at these instants the residual signal contains only the received useful data signal. This residual signal, which is substantially free from echo signals, is filtered by a low-pass filter 21 and thereafter applied to the receiver 9.

The instants at which the binary data signal appears at the input 11-1 of the transversal filter 11 are designated nT, where n is an integer between $-\infty$ to $+\infty$.

At the sampling instants nT:
D(n) denotes the data signal applied to the digital filter 11,
s(n) denotes the received useful data signal,
$\epsilon(n)$ denotes the echo signal,
$\hat{\epsilon}(n)$ denotes the synthetic echo signal,
e(n) denotes the analog residual signal,
E(n) denotes the digital residual signal.

The analog residual signal e(n) may be expressed by:

$$e(n) = s(n) + [\epsilon(n) - \hat{\epsilon}(n)] \quad (1)$$

The echo canceller has for its function to cancel the remaining echo signal:

$$[\epsilon(n) - \hat{\epsilon}(n)].$$

At an instant nT, the transversal filter 11 stores N preceding samples of the data signal which may be designated by D(n−q), where q is an integer between 0 and N−1. If at an instant nT, the N coefficients of said filter are denoted $C_q(n)$ (where q=0, 1, ... N−1), each sample S(n) supplied by the filter at the instant nT follows from the processing operation $$S(n) = \sum_{q=0}^{N-1} D(n) \cdot C_q(n)$$

The criterium which is often used for adjusting the coefficients of the filter consists in minimizing the mean square value of the remaining echo signal $\epsilon(n) - \hat{\epsilon}(n)$. This adjustment is effected starting from the digital version E(n) of the residual signal e(n) by adjusting each coefficient $C_q(n)$ iteratively in accordance with the following recursion formula, which connects the value $C_q^i(n)$ at the iteration i with the value $C_q^{i+1}(n)$ of this coefficient at the iteration i+1:

$$C_q^{i-i}(n) = C_q^i(N) + \alpha \cdot E^i(n) \cdot D(n-q) \quad (3)$$

In this formula $E^i(n)$ is the value of the digital residual signal at iteration i; D(n−q) is the value of a sample of the data signal entering the filter at a previous instant (n−q)T and to be multiplied in the filter by the coefficient $C_q(n)$; $\alpha$ is a coefficient small with respect to unity and determines the magnitude of the coefficient modification at each iteration.

Figure 2:
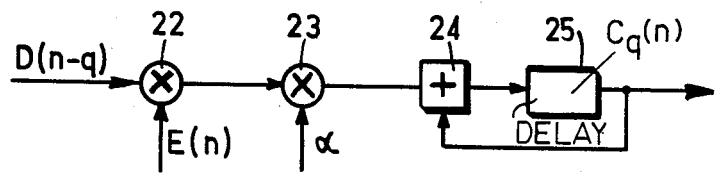
FIG. 2 shows a block diagram of the control circuit for a filter coefficient of the echo canceller.

The recursion formula (3) is implemented for every coefficient $C_q(n)$ by means of the circuit shown in FIG. 2, which comprises a multiplying circuit 22 forming the product D(n−q)·E(n) at each instant nT. This product is weighted by the coefficient $\alpha$ by means of a multiplying circuit 23. By means of an adder circuit 24 the modifying term $\alpha \cdot E(n) \cdot D(n-q)$ is added to the considered coefficient $C_q(n)$ at the output of a delay circuit 25 which produces a delay T. If the period of the recursions is T, the value of the coefficient to be used in filter 11 at the next instant (n+1)T is obtained at the output of the delay circuit 25. After a certain number of consecutive iterations, the set of coefficients of the filter 11 must converge to such values that the remaining echo $[\epsilon(n) - \hat{\epsilon}(n)]$ in the residual signal e(n) has been substantially cancelled.

But, as mentioned in the foregoing, a problem as regards this convergence may occur when the recursion formula (3) is applied with a digital signal E(n) having a small number of bits. This is done in high-speed data transmission systems which necessitate a high sampling frequency $f_e$ and, consequently, a high conversion speed for the analog-to-digital converter 18. For a baseband data transmission with 64 Kbit/s and a biphase coding in the encoder 8, the sampling frequency $f_e$ is, for example, 256 kHz. In order to reduce the costs of the converter 18, it would be very advantageous if its accuracy may be low. The simplest and least expensive solution is the use of a converter 18 which produces a digital signal E(n) with one single bit, this bit indicating the sign of the residual signal e(n). But, as shown in formula (1), at the sampling instant the residual signal e(n) is the sum of the received data signal s(n) and the remaining echo signal $[\epsilon(n) - \hat{\epsilon}(n)]$. The sign of the residual signal e(n), i.e. the value of the bit of the signal E(n), is determined by the sign of the largest of the two signals s(n) and $[\epsilon(n) - \hat{\epsilon}(n)]$.

If at the sampling instants nT it holds that;

$$|\epsilon(n) - \hat{\epsilon}(n)| > |s(n)| \quad (4)$$

the bit of the signal e(n) is determined by the sign of the remaining echo signal and the modification of the coefficients of the filter is effected in the proper manner to reduce the remaining echo signal.

If at the sampling instants nT it holds that;

$$|\epsilon(n) - \hat{\epsilon}(n)| < |s(n)| \quad (5)$$

the bit of the signal E(n) is determined by the sign of the received data signal; the modification of the coefficients is then independent of the remaining echo signal and the remaining echo signal is not of necessity reduced thereby.

In a homochronous transmission system, the sampling frequency $f_e$, as for the case of FIG. 1, is derived from a clock signal which is produced by the extraction circuit 10 and which is in synchronism with the received data signal. Hence the sampling instants have a fixed position with respect to the received data signal s(t). These sampling instants may permanently occur at instants at which the amplitude $|s(n)|$ of the samples of the received data signal is great and, during the convergence, it is possible to reach very rapidly the situation in which condition (5) is satisfied. The convergence of the echo canceller then stops at a remaining echo signal having the amplitude $|\epsilon(n) - \hat{\epsilon}(n)|$ in the order of magnitude of the amplitude $|s(n)|$, which is great.

It may be noted that in a plesiochronous transmission system, the sampling frequency $f_e$ would be derived from a local clock signal which is independent of the clock signal produced by the extraction circuit 10. In that case the amplitude $|s(n)|$ of the samples of the received data signal s(t) at the sampling instants $t = nT$ may assume all the values between a maximum and zero, so that at certain sampling instants one is of necessity in the situation of condition (4), in which the coefficients are modified in the proper manner. So the convergence of the coefficients may be continued until values for the remaining echo signal which are substantially zero, however, with an increased convergence time.

The present invention has for its main object to obviate this serious drawback which results from the use of a one-bit analog-to-digital converter in an echo canceller employed in a homochronous transmission system.

In the embodiment shown in FIG. 1, the echo canceller in accordance with the invention comprises an analog-to-digital converter 18 which converts the residual signal e(n) applied to its input 17 into a two-bit digital signal E(n) appearing at its output 19 and which has controllable dynamics adjusted by a dynamics control signal applied to a control terminal 30. This dynamics control signal is obtained at the output of an attenuator 32, which receives the output signal from a peak detector 31 connected to the output of the filter 21. This peak detector 31 produces a voltage $V_p$ which indicates the peak value of the residual signal with such a time constant that this voltage $V_p$ can follow, in a correct way, the decrease of the residual echo signal during the convergence. The attenuator 32 produces the voltage $\beta \cdot V_p$, where $\beta$ is a positive coefficient less than unity.

The voltage $\beta \cdot V_p$ is employed as a reference signal in the analog-to-digital converter 18. This reference signal is applied to the non-inverting input of a comparator circuit 33 and, after the polarity thereof has been changed in an inverting circuit 34, to the non-inverting input of a comparator circuit 35. The analog residual signal e(n) is applied to the inverting input of each of the comparator circuits 33 and 35. The outputs of these two comparator circuits 33 and 35 are connected to the inputs of an Exclusive NOR-gate 36. As will be demonstrated hereinafter, the two bits of the signal E(n) produced by the converter 18 are formed at the respective outputs of the comparator circuit 35 and the Exclusive NOR-gate 36.

Figure 3:
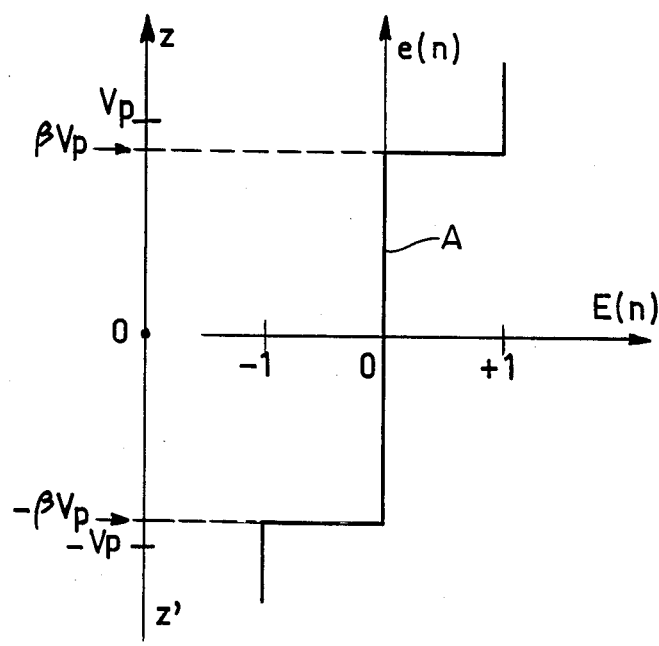
FIGS. 3 and 4 show the respective responses of two-bit and three-bit analog-to-digital converters as a function of the residual signal.

The diagram of FIG. 3 illustrates the operating principle of analog-to-digital converter 18, described in the foregoing.

In the rectangular coordinate system shown, the values of the analog residual signal e(n) are plotted on the ordinate and the three discrete values $+1$, $-1$ and $0$ which the digital residual signal E(n) can assume in response to the signal e(n) are plotted on the abscissa. Also shown along the ordinate are the voltages $+V_p$ and $-V_p$, which correspond to the peak value $V_p$ detected by the peak detector 31, and the voltages $+\beta V_p$ and $-\beta V_p$ which are employed as threshold voltages in comparator circuits 33 and 35. The curve denoted as A indicates the response E(n) produced by the converter 18 as a function of the analog residual signal e(n).

$-\beta V_p < e(n) < +\beta \cdot V_p$ results in E(n)=0;
$e(n) > \beta \cdot V_p$ results in E(n)=+1;
$e(n) < -\beta \cdot V_p$ results in E(n)=−1.

The following Table I shows how the three discrete values $+1$, $-1$ and 0 of the digital signal E(n) are coded.

TABLE I

| e(n) | output 35 | output 33 | output 36 | E(n) S$_1$ | S$_2$ |
|---|---|---|---|---|---|
| $> \beta V_p$ | 0 | 0 | 1 | 0 | 1 |
| $+\beta \cdot V_p$ | — | — | — | — | — |
|  | 0 | 1 | 0 | 0 | 0 |
| $-\beta \cdot V_p$ | — | — | — | — | — |
| $< -\beta V_p$ | 1 | 1 | 1 | 1 | 1 |

The first column shows the two threshold values $+\beta V_p$ and $-\beta V_p$, to which the analog residual signal e(n) is compared, which signal varies between a value greater than $+\beta V_p$ and a value smaller than $-\beta V_p$. The next three columns show the logic signals resulting therefrom at the outputs of the comparator circuits 35, 33 and the Exclusive NOR-gate 36. Finally, the last column shows the value of the two bits S$_1$ and S$_2$ of the digital residual signal E(n), the bit S$_1$ being supplied at the output of the comparator circuit 35 and the bit S$_2$ at the output of the circuit 36. It will be clear that the resulting digital signal S$_1$, S$_2$ represents, in the "two's complement code," the signal E(n) having values $+1$, $-1$ and 0, in accordance with the diagram shown in FIG. 3. The signal coded thus is very suitable for the computations to be carried out in control circuit 12.

When using this two-bit analog-to-digital converter 18, which is adjusted starting from the level of the residual signal, there is no risk whatsoever, in contrast with the situation in which a one-bit converter is used, of the convergence of the echo canceller stopping at a comparatively large amplitude of the remaining echo signal, in the order of magnitude of the amplitude of the received data signal at the sampling instants.

First, it is assumed that the echo signal $\epsilon(t)$ is smaller than the received data signal s(t) so that the contribution of the remaining echo signal is always less than the contribution of the received data signal to the detected peak value $V_p$ of the residual signal. Then the digital residual signal E(n) has, at least at given sampling instants, a value which is characteristic of the remaining echo signal, as long as it exceeds $V_p - \beta V_p = V_p(1-\beta)$. As long as this condition is realized, the filter coefficients of the echo canceller converge in such a manner that the remaining echo signal decreases and that simultaneously the detected peak value $V_p$ decreases to a value $V_{po}$ which corresponds to the order of magnitude of the peak value of the received data signal. The final value of the remaining echo is then approximately equal to $V_{po}(1-\beta)$.

Now it is assumed that the echo signal $\epsilon(t)$ is greater than the received data signal so that, when the echo canceller is started, the contribution of the remaining echo signal to the detected peak value $V_p$ is larger than the contribution of the received data signal. The digital residual signal E(n) then has, at least at given sampling instants, a value which differs from zero and indicates a high amplitude for the remaining echo signal. For these sampling instants, a correction of the filter coefficient of the echo canceller is performed in such a manner that the remaining echo signal is reduced, whereafter the above-described situation in which the contribution of the remaining echo signal to the detected peak value $V_p$ is smaller than the contribution of the received data signal is obtained again. The remaining echo may then reach the final value $V_{po}(1-\beta)$.

It will be clear that in order to reduce the final value of the remaining echo signal, it is important to give the coefficient $\beta$, which fixes the threshold of the analog-to-digital converter 18, a value of approximately 1. However, at values which are too close to 1 there is a risk that the output signal E(n) of this converter may have a value zero for the majority of the sampling instants, which increases the convergence time. It is, for example, possible to choose a value of 0.9 for the coefficient $\beta$, whereby a small value of the residual echo signal and a reasonable convergence time are simultaneously possible.

As results from the description given in the foregoing, it may happen that at given sampling instants, when the echo canceller is started, particularly if the echo signal is greater than the received data signal, the digital-two-bit signal E(n) indicates a zero value for the remaining echo signal, while this signal has a comparatively high value. From this it follows that substantially no modification of the filter coefficients of the echo canceller at those sampling instant is effected, which increases the convergence time of the echo canceller.

For the case in which a shorter convergence time is desired, an analog-to-digital converter may be employed which produces a digital residual signal E(n) having more than two bits and controllable dynamics, this converter being controlled by the detected peak value $V_p$ of the residual signal.

Figure 4:
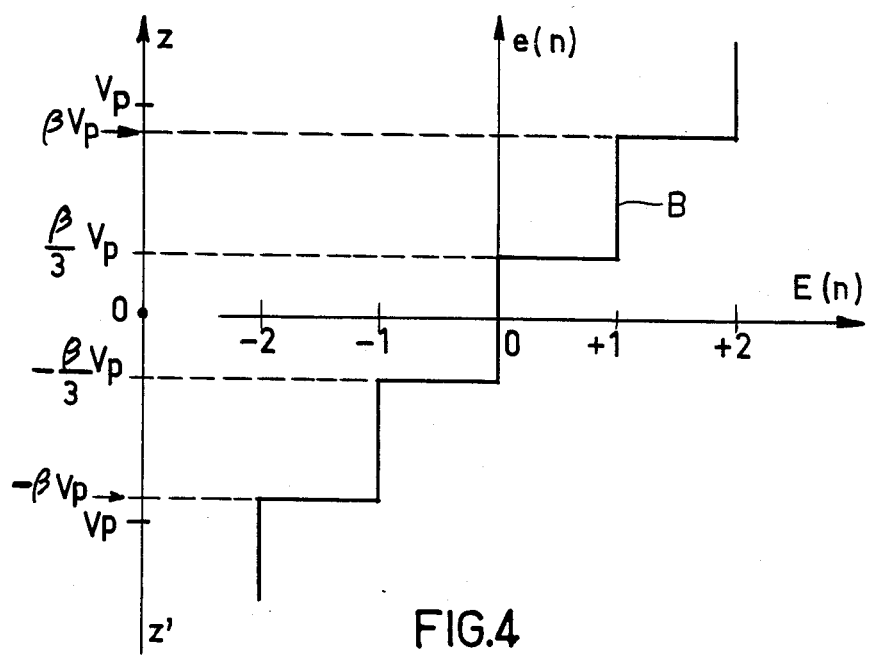

By way of example, the diagram of FIG. 4, which is drawn up in a manner which is similar to that of FIG. 3, shows the response E(n) of a three-bit analog-to-digital converter as a function of the analog residual signal e(n). The digital residual signal E(n) may assume five values $+1$, $-1$, $+2$, $-2$ and 0, which can be encoded with 3 bits. Plotted along the ordinate are the two voltages $+V_p$ and $-V_p$, which correspond to the detected peak value $V_p$ and the four threshold voltages $\pm \beta V_p$ and $\pm \beta V_p/3$ employed in the converter. The step curve B represents the response of the converter. It particularly shows that the range of the analog residual signal e(n) at which the digital residual signal E(n) has zero value is reduced to $[-\beta V_p/3, +\beta V_p/3]$, instead of $[-\beta V_p, +\beta V_p]$ in the case the two-bit converter was used. From this it follows that a larger number of sampling instants results in a modification of the coefficients with the tendency to reduce the remaining echo signal, which provides a reduction of the convergence time. The final value of the remaining echo signal is always $V_{po}(1-\beta)$, independent of the difference $2\beta V_p/3$ between two consecutive threshold values.

In the diagram of FIG. 4 the four threshold voltages used in the converter are uniformly distributed, so that the conversion law is linear. It might alternatively be possible to distribute the thresholds in a different way relative to each other to obtain a conversion law which, in certain cases, is more suitable for a rapid convergence of the echo canceller.

Finally, it is very well possible to use a converter with a large number of bits and controllable dynamics which is adjusted by the level of the residual signal. However, the reduction of the convergence time becomes increasingly less and, above a certain number of bits, does not justify the higher costs for the converter.

With respect to a prior art echo canceller employing a converter with fixed dynamics and providing an ultimately remaining echo depending on the step-size of the converter, the echo canceller in accordance with the invention, which employs a converter whose dynamics are controlled by the level of the residual signal, has the advantage that it ultimately provides a residual echo signal $V_{po}(1-\beta)$ which does not depend on the step-size of the converter. It is then possible to use a converter having a smaller number of bits, depending on the permissible convergence time.

The use of the echo canceller in accordance with the invention is not limited to the chosen example as regards the data transmission in baseband. It may alternatively be used for data transmission in the voice-band, in which the digital version of a residual signal is used to adjust the coefficients of the assembly of digital filters. The echo canceller in accordance with the invention may alternatively be used in a plesiochronous data transmission system in order to reduce the convergence time compared with that of an echo canceller employing a one-bit converter. Finally, this echo canceller is also suitable for use in a transmission system for telephone signals.

What is claimed is:

1. In echo cancelling means connected between transmitting circuit means carrying first information signals for transmission to a remote station and receiving circuit means, for cancelling echo signals occurring in said receiving circuit means in response to said first information signals, said echo cancelling means having controllable digital signal processing means with associated control circuit means connected to said transmitting circuit means for furnishing a synthetic echo signal in response to a digital residual signal and said first information signals, sampling means for sampling said received signal thereby creating a sampled received signal, and difference circuit means connected to said digital signal processing means and said sampling means for furnishing a residual signal corresponding to the difference between said sampled received signal and said synthetic echo signal, the improvement comprising means connected to said difference circuit means for furnishing a reference signal varying in dependence on the level of said residual signal; and analog-to-digital converter means for converting said residual signal into said digital residual signal for said digital signal processing means under control of said reference signal.

2. Echo cancelling means as set forth in claim 1, wherein said reference signal furnishing means comprises a peak detector furnishing a peak output signal varying in dependence on the peak of said residual signal, and attenuation circuit means (32) for attenuating said peak output signal, the so attenuated peak output signal constituting said reference signal.

3. Echo cancelling means as set forth in claim 2, wherein said reference signal varies between a maximum positive and a maximum negative value;

and wherein said analog-to-digital converter means comprises comparator means for comparing said reference signal to said residual signal and furnishing said residual signal having a first, second or third value, respectively, when said residual signal has a value exceeding said maximum positive value, has a value between said maximum negative and positive value, or has a value more negative than said maximum negative value, respectively.

4. Echo cancelling means as set forth in claim 3, wherein said attenuation circuit means multiplies said peak output signal by a value near unity.

* * * * *